United States Patent
Schwarzmueller et al.

(10) Patent No.: US 9,396,370 B2
(45) Date of Patent: Jul. 19, 2016

(54) CARRIER COMPENSATION READER

(71) Applicant: Atmel Corporation, San Jose, CA (US)

(72) Inventors: Marco Schwarzmueller, Heilbronn (DE); Ulrich Grosskinsky, Neudenau (DE); Wolfgang Schneider, Bietigheim-Bissingen (DE)

(73) Assignee: Atmel Corporation, San Jose, CA (US)

( * ) Notice: Subject to any disclaimer, the term of this patent is extended or adjusted under 35 U.S.C. 154(b) by 548 days.

(21) Appl. No.: 13/870,270

(22) Filed: Apr. 25, 2013

(65) Prior Publication Data

US 2014/0320264 A1    Oct. 30, 2014

(51) Int. Cl.
*H04Q 5/22*        (2006.01)
*G06K 7/10*        (2006.01)

(52) U.S. Cl.
CPC ........ *G06K 7/10316* (2013.01); *G06K 7/10465* (2013.01)

(58) Field of Classification Search
None
See application file for complete search history.

(56) References Cited

U.S. PATENT DOCUMENTS

| | | | |
|---|---|---|---|
| 2005/0186924 A1* | 8/2005 | Hur | H04B 1/7083 455/161.1 |
| 2007/0046427 A1* | 3/2007 | Ghabra | B60R 25/246 340/5.61 |
| 2007/0120674 A1* | 5/2007 | Takeuchi | G06K 7/0008 340/572.2 |
| 2007/0194925 A1* | 8/2007 | Karr | G01S 3/52 340/572.1 |
| 2011/0068861 A1* | 3/2011 | Denison | H03F 3/38 330/10 |
| 2014/0288393 A1* | 9/2014 | Grevious | A61N 1/08 600/301 |

* cited by examiner

*Primary Examiner* — Curtis King
(74) *Attorney, Agent, or Firm* — Fish & Richardson P.C.

(57) ABSTRACT

A carrier compensation reader compensates a carrier signal. The carrier compensation reader transmits, via an antenna, a first carrier signal and obtains a second carrier signal based on the first carrier signal. The carrier compensation reader configures a compensation circuit to receive a receiver output signal based on the second carrier signal and generate a compensation signal based on the receiver output signal to compensate the second carrier signal. The carrier compensation reader obtains a carrier compensation signal summing the second carrier signal and the compensation signal.

21 Claims, 4 Drawing Sheets

CARRIER COMPENSATION READER

TECHNICAL FIELD

This disclosure relates generally to electronics and more particularly to reader systems.

BACKGROUND

Radio-frequency (RF) identification is the use of a wireless system that uses radio-frequency electromagnetic fields to transfer data from a transponder (e.g., a tag) to a reader, for the purposes of identification and tracking. The transponder contains electronically stored information that can be read by a reader base station of the reader within a read distance. Some passive transponders (e.g., with no battery) are powered and read within the read distance via magnetic fields (e.g., electromagnetic induction) from the reader base station.

For example, a backscattering method for a transponder within a key of a car together with a reader base station in the car (e.g., at a lock of the car), is a widely used method for immobilization used as anti-theft control of cars (e.g., immobilizer function of cars). The reader base station interacts, via an antenna, with the transponder and gets a backscattered signal including information from the transponder. However, due to high electromagnetic interference (EMI) on wires between the reader base station and a reader coil in the car, the reader base station has a low sensitivity, which limits the read distance between the transponder and the reader coil. Additionally down mixing of thermal and harmonics noises lead to low EMI immunity as well as low sensitivity and low read distance.

To solve these problems, in some cases, a separate reader coil exclusively is used for the immobilizer function and a separate electronic module is placed very close to the reader coil. In some cases, the reader base station is placed very close to the reader coil so that the transponder is mechanically very close to the reader coil (e.g., by putting the reader coil around the lock and placing the transponder into the key at a position very close to the reader coil). However, this solution involves high cost and reduced mechanical flexibility for the key design. Due to LC tolerances in the transponder and the reader coil, the backscattered signal can be zero amplitude modulation (e.g., pure phase modulation). Zero amplitude modulation can make it difficult to demodulate the backscattered signal to retrieve the transponder information for immobilization and/or identification.

SUMMARY

A carrier compensation reader compensates a carrier signal. The carrier compensation reader transmits, via an antenna, a first carrier signal and obtains a second carrier signal based on the first signal. The carrier compensation reader configures a compensation circuit to receive a receiver output signal based on the second carrier signal and generate a compensation signal based on the receiver output signal to compensate the second carrier signal. The carrier compensation reader obtains a carrier compensation signal summing the second carrier signal and the compensation signal.

Particular implementations of the carrier compensation reader can provide one or more of the following advantages: 1) The carrier compensation reader allows high electromagnetic interference (EMI) immunity and achieves higher sensitivity than some conventional car reader systems, by using a digitized low band width and high dynamic range direct conversion receiver. 2) Because of the high EMI immunity, the carrier compensation reader allows positioning of the reader base station far away from the reader coil to reduce the number of electronic modules in the car. 3) Because of high sensitivity, the carrier compensation reader allows using an available coil from passive entry or passive start system for the immobilizer function. 4) The carrier compensation reader can significantly reduce the overall system cost. 5) The carrier compensation reader can demodulate any constellation of the backscattered signal removing completely zero amplitude modulation problems of other reader systems. 6) The carrier compensation reader achieves a larger read distance than the current reader systems, allowing new mechanical concept to car manufacturers. 7) The carrier compensation reader can be used for immobilizer function of cars and other identification and tracking applications.

The details of one or more disclosed implementations are set forth in the accompanying drawings and the description below. Other features, aspects, and advantages will become apparent from the description, the drawings and the claims.

DETAILED DESCRIPTION

System Overview

Figure 1:
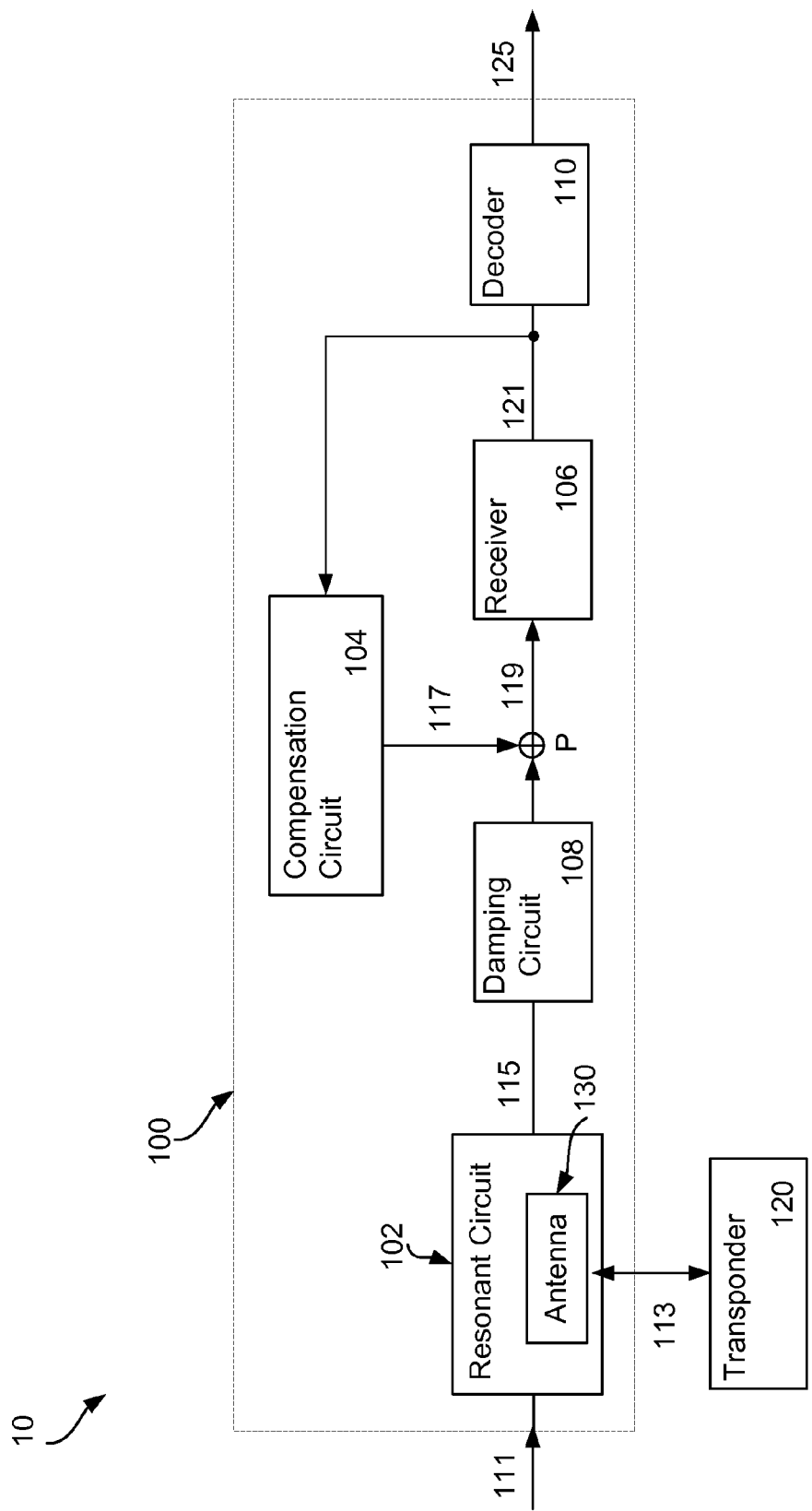
FIG. 1 is an example block diagram of a carrier compensation reader.

FIG. 1 is an example block diagram 10 of a carrier compensation reader 100. The carrier compensation reader 100 comprises a resonant circuit 102, a compensation circuit 104, and a receiver 106. The carrier compensation reader 100 can also comprise a damping circuit 108 and a decoder 110. The resonant circuit 102 includes an antenna 130, and the resonant circuit 102 interacts with a transponder 120 via the antenna 130.

In some implementations, the antenna 130 includes an antenna inductor and the transponder 120 includes a transponder inductor. The carrier compensation reader 100 interacts with the transponder 120 via magnetic fields (e.g., electromagnetic induction) between the antenna inductor and the transponder inductor, and the interaction 113 between these two inductors can include magnetic energy coupling. In some examples, the transponder 120 is a passive transponder, which can rely on the magnetic energy coupling to power the transponder and transmit information (e.g., identification information of the transponder) from the transponder 120 to the resonant circuit 102.

The resonant circuit 102 can include a resonant circuit input for receiving an original carrier signal 111 (e.g., an RF signal). In some examples, the original carrier signal 111 is coded by reducing an amplitude of the carrier signal for a time gap and coding data into a time distance between two adjacent time gaps. The resonant circuit 102 modifies the original carrier signal 111 to be a first carrier signal and transmits, via the antenna, the first carrier signal to the transponder 120.

The resonant circuit 102 can include a resonant circuit output for outputting a new carrier signal 115. In some implementations, the new carrier signal 115 includes the first carrier signal. In some other implementations, the new carrier signal 115 includes the first carrier signal and a backscattered signal. The backscattered signal is based on an action applied on the transponder 120. The action can include changing a transponder circuit. Due to the interaction 113, the new carrier signal 115 is changed by the action applied at the transponder to include the backscattered signal. The backscattered signal can include the information from the transponder for identification and/or immobilization. The backscattered signal can be coded (e.g., by using a Manchester coded modulation). In some examples, no action is applied on the transponder. The interaction 113 between the transponder and the resonant circuit does not change, and the new carrier signal 115 remains unchanged (e.g., includes only the first carrier signal).

The compensation circuit 104 is used to introduce a compensation signal 117 to compensate the new carrier signal 115. The receiver 106 is coupled to both the resonant circuit 102 and the compensation circuit 104 at a node P. The receiver 106 includes a receiver input for receiving a carrier compensation signal 119 summing the new carrier signal 115 and the compensation signal 117 at the node P. The receiver 106 also includes a receiver output for outputting a receiver output signal 121.

In some examples, the new carrier signal 115 comprises a main component based on the first carrier signal (thus based on the original carrier signal 111) and a second component based on the backscattered signal, and the amplitude of the second component is substantially smaller than the amplitude of the main component. The carrier compensation reader 100 is configured to use the compensation signal 119 to compensate the main component of the carrier signal so that the carrier compensation signal is substantially based on the backscattered signal.

In some implementations, the compensation circuit 104 receives the receiver output signal 121. If the receiver output signal 121 is substantially based on the first carrier signal, the compensation circuit 104 will generate a compensation signal 117 based on the receiver output signal 121 so that the carrier compensation signal 119 is substantially based on the backscattered signal. If the receiver output signal 121 is substantially based on the backscattered signal, the compensation circuit 104 will not generate a new compensation signal but will output the compensation signal that is generated when the receiver output signal is substantially based on the first carrier signal.

In some implementations, the carrier compensation reader 100 comprises the damping circuit 108 coupled between the resonant circuit 102 and the compensation circuit 104 (e.g., before the node P). The damping circuit 108 is used to adjust the amplitude of the new carrier signal 115.

To retrieve the backscattered signal from the new carrier signal 115, first, the damping circuit 108 adjusts the new carrier signal 115 with a high damping ratio (e.g., by largely reducing the amplitude of the new carrier signal 115). As a result, the adjusted carrier signal with the high damping ratio is substantially based on the main component of the new carrier signal 115. The receiver 106 receives the adjusted carrier signal and generates the receiver output signal 121. The receiver output signal 121 is substantially based on the adjusted carrier signal. The compensation circuit 104 analyzes the receiver output signal 121 to retrieve the main component of the new carrier signal 115, and generates a new compensation signal 117 based on the main component and a lower damping ratio. The new compensation signal 117 can be configured to substantially compensate the main component of the new carrier signal 115 adjusted with the lower damping ratio.

Second, the damping circuit 108 switches to the lower damping ratio and the new carrier signal 115 is adjusted with the lower damping ratio. The carrier compensation signal 119 sums the new compensation signal 117 and the carrier signal adjusted with the lower damping ratio. Since the new compensation signal 117 is configured to substantially compensate the main component adjusted with the lower damping ratio, the carrier compensation signal 119 will be substantially based on the second component of the new carrier signal 115 (e.g., the component based on the backscattered signal). Therefore, the receiver output signal 121 will be substantially based on the backscattered signal.

In some implementations, the receiver 106 is configured to generate, at a first time, a first receiver output signal that is used to generate the compensation signal 117. The compensation signal 117, the original carrier signal 111 and the new carrier signal 115 are phase synchronous. The sum of the amplitude value of the compensation signal 117 and the amplitude value of the main component of the new carrier signal 115 is substantially identical to zero. Therefore, the carrier compensation signal 119 can be substantially based on the second component of the new carrier signal 115. The receiver 106 can be configured to generate, at a second time after the first time, a second receiver output signal based on the carrier compensation signal. As a result, the second receiver output signal will be substantially based on the backscattered signal including the information from the transponder.

In some implementations, the carrier compensation reader 100 comprises the decoder 110 for decoding the second receiver output signal to get a decoded signal 125. The decoded signal 125 can be used to retrieve the information from the transponder 120 for identification and/or immobilization.

Example System Including Carrier Compensation Reader

Figure 2:
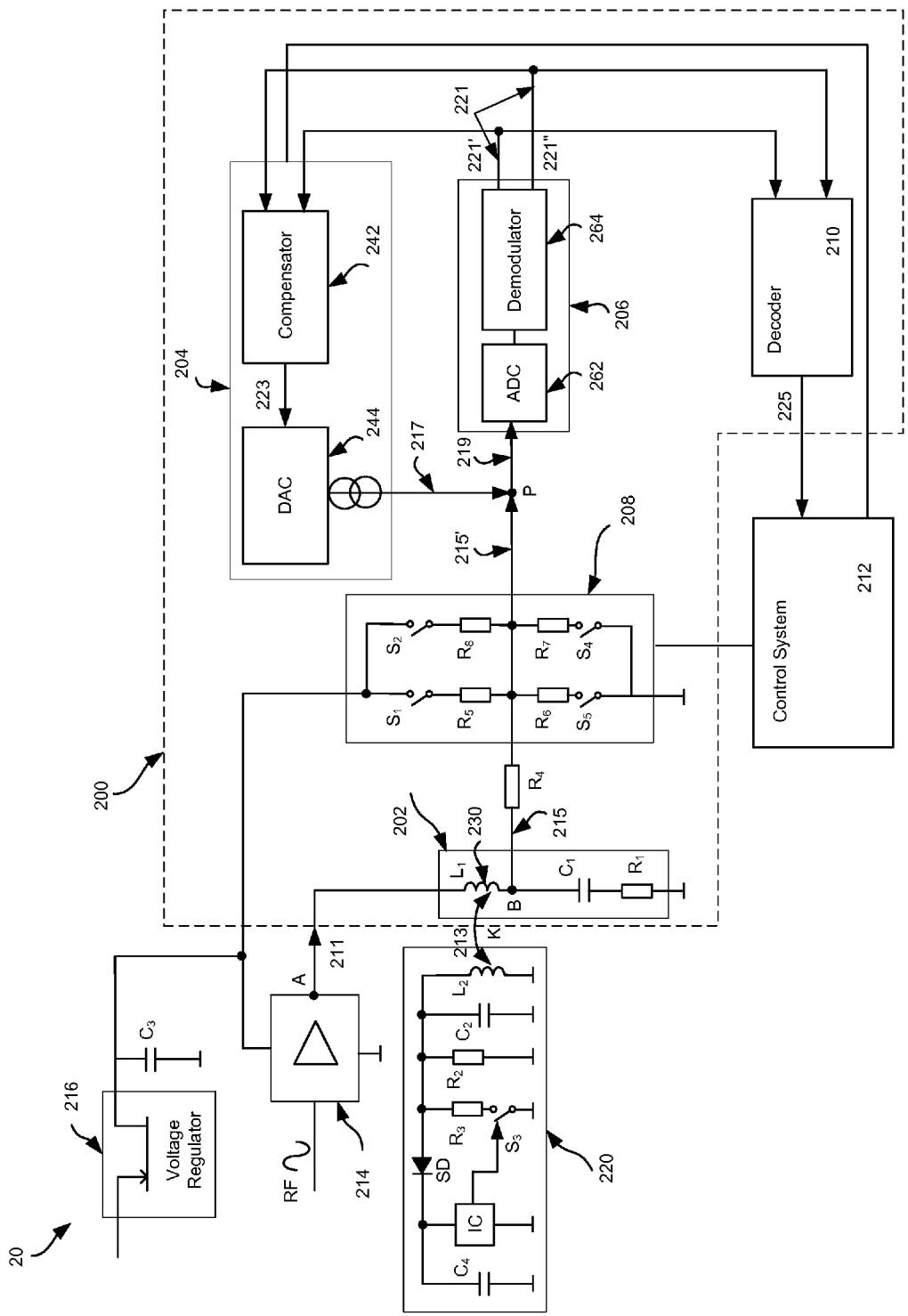
FIG. 2 is an example block diagram of a system including an example carrier compensation reader.

FIG. 2 is an example block diagram of a system 20 including an example carrier compensation reader 200.

In some implementations, the system 20 comprises a voltage supply 216, and a driver 214. A control system 212 can be internal or external to the carrier compensation reader 200. The carrier compensation reader 200 comprises a resonant circuit 202, a damping circuit 208, a compensation circuit 204 and a receiver 206. The carrier compensation reader 200 can further comprise a decoder 210. The damping circuit 208, the compensation circuit 204, the receiver 206 and the decoder 210 can be integrated into an integrated chip (IC). The integrated chip can also integrate the control system 212.

The voltage supply 216 can include a voltage regulator and a capacitor $C_3$ coupled to a ground node. The voltage supply 216 is configured to deliver a supply voltage $V_S$ to the driver 214. In some examples, the supply voltage $V_S$ is 15 V with a maximum current of 100 mA.

The driver 214 is coupled to the voltage supply 216 for receiving the supply voltage. The driver is coupled to the resonant circuit 202 and is configured to deliver an original carrier signal (e.g., an RF signal) 211 to the resonant circuit 202 at a node A. In some implementations, the driver 214 includes an RF power amplifier for converting a low-power RF signal into a larger-power RF signal. In some examples, the original carrier signal 211 has a voltage with a peak to peak amplitude value close to $V_S$. The original carrier signal 211 can be derived from a system clock and be phase synchronous with other RF signals derived from the system clock. In some implementations, the original carrier signal 211 is coded by reducing the amplitude at the node A for a short time (also called a gap) and coding data into a time distance between two adjacent gaps.

In some implementations, the resonant circuit 202 (e.g., a reader base station antenna) comprises a capacitor $C_1$, an inductor $L_1$ and a resistor $R_1$. The inductor $L_1$ is coupled to the node A, the resistor $R_1$ is grounded, and the capacitor $C_1$ is coupled between the inductor $L_1$ and the resistor $R_1$. The capacitor $C_1$, the inductor $L_1$ and the resistor $R_1$ are configured to be in series resonant operation mode. The resonant circuit 202 can have a quality factor Q. In some examples, Q is 10.

The resonant circuit 202 comprises a resonant circuit input coupled to the driver 214 at the node A for receiving the original carrier signal 211. The resonant circuit 202 modifies the received original carrier signal 211 into a first carrier signal at a node B (also called a tap point) between the capacitor $C_1$ and the inductor $L_1$, and transmits, via the inductor $L_1$, the first carrier signal.

The resonant circuit 202 comprises a resonant circuit output for outputting a new carrier signal 215 at the node B. In some implementations, the new carrier signal 215 is the first carrier signal when there is no interaction with external devices. Due to the resonant operation, the amplitude of the new carrier signal 215 at the node B can be higher by the quality factor Q than the amplitude of the original carrier signal 211 at the node A. In some examples, the new carrier signal 215 at the node B can be phase shifted if the resonance frequency of the resonant circuit 202 is not equal to the frequency of the original carrier signal 211. In some examples, the amplitude at the node A is 5 Vp (e.g., peak value), and the amplitude at the node B is 50 Vp with a quality factor of 10. In some examples, a current following through the resonant circuit 202 is 200 mAp.

In some implementations, the transponder 220 includes a transponder circuit comprising an inductor $L_2$, a transponder IC, and a switch $S_3$. The transponder circuit 220 can further comprise a capacitor $C_2$, a capacitor $C_4$, a resistor $R_2$, a resistor $R_3$, and a diode (e.g., silicon diode (SD)). The inductor $L_2$ forms with the capacitor $C_2$ and the resistor $R_2$ a transponder resonance circuit of the transponder 220. The Q factor of the transponder resonance circuit parallel to the resistor $R_3$ and the switch $S_3$ can be changed to a lower value by switching the switch $S_3$ from off (e.g., the switch $S_3$ is open) to on (e.g., the switch $S_3$ is closed). The diode and the capacitor $C_4$ are used to power the transponder IC from the magnetic field by rectifying a sine wave from the transponder resonance circuit. The switch $S_3$ coupled to the transponder IC is coupled between the resistor $R_3$ and the ground in order to change the Q factor of the transponder resonance circuit.

In some implementations, the resonant circuit 202 interacts with the transponder 220 via an antenna 230. The antenna 230 includes the inductor $L_1$, thus the resonant circuit 202 interacts with the transponder 220 via magnetic fields (e.g., electromagnetic induction) between the inductor $L_1$ and the inductor $L_2$. The interaction 213 between these two inductors can include magnetic energy coupling by a coupling factor K. In some examples, the coupling factor K is down to 1%. In some examples, the transponder 220 is a passive transponder (e.g., with no battery). The transponder 220 uses the magnetic energy coupled by the coupling factor between the inductor $L_1$ and the inductor $L_2$ to power the transponder IC. The transponder 120 can also transmit, via the antenna 230, information from the transponder 220 to the resonant circuit 202 through the interaction 213 by changing the Q factor of the transponder resonance circuit with the switch $S_3$.

In some implementations, if the switch $S_3$ is off (e.g., the switch $S_3$ is open), the transponder IC disconnects the resistor $R_3$ from the transponder resonance circuit. Therefore, the transponder IC cannot affect the interaction between the inductor $L_1$ and the inductor $L_2$, and the new carrier signal 215 at the node B is substantially based on the first carrier signal and remains unchanged. If the switch is on (e.g., the switch $S_3$ is closed), the transponder IC connects the resistor $R_3$ to the inductor $L_2$, which lowers the quality factor Q of the transponder resonance circuit and slightly changes the amplitude and phase of the new carrier signal 215 at the node B. Therefore, the transponder IC can transmit the information (e.g., identification information of the transponder IC) from the transponder through the interaction between the inductor $L_1$ and the inductor $L_2$. The new carrier signal 215 at the node B can change slightly if the switch $S_3$ is closed.

The difference between the unchanged carrier signal and the changed carrier signal can be called a backscattered signal of the new carrier signal 215. The backscattered signal includes the information from the transponder that can be used for identification and/or immobilization. The transponder 220 transmits the information from the transponder 220 to the resonant circuit 202 by switching the switch $S_3$ from off to on to change the magnetic energy coupling between the inductor $L_1$ and the inductor $L_2$. Correspondingly, the new carrier signal 215 is changed to include the backscattered signal.

In some examples, the changed carrier signal 215 comprises a main component based on the first carrier signal (thus the original carrier signal 211) and a second component based on the backscattered signal, and the amplitude of the second component based on the backscattered signal is substantially smaller than the amplitude of the main component based on the original carrier signal. The unchanged carrier signal can be the main component of the changed carrier signal, and the backscattered signal can be the second component of the changed carrier signal. In some examples, the amplitude of the unchanged carrier signal 215 at the node B is 50 Vp and the amplitude of the backscattering signal is about 5 mVp.

Example Constellation Diagram

Figure 3:
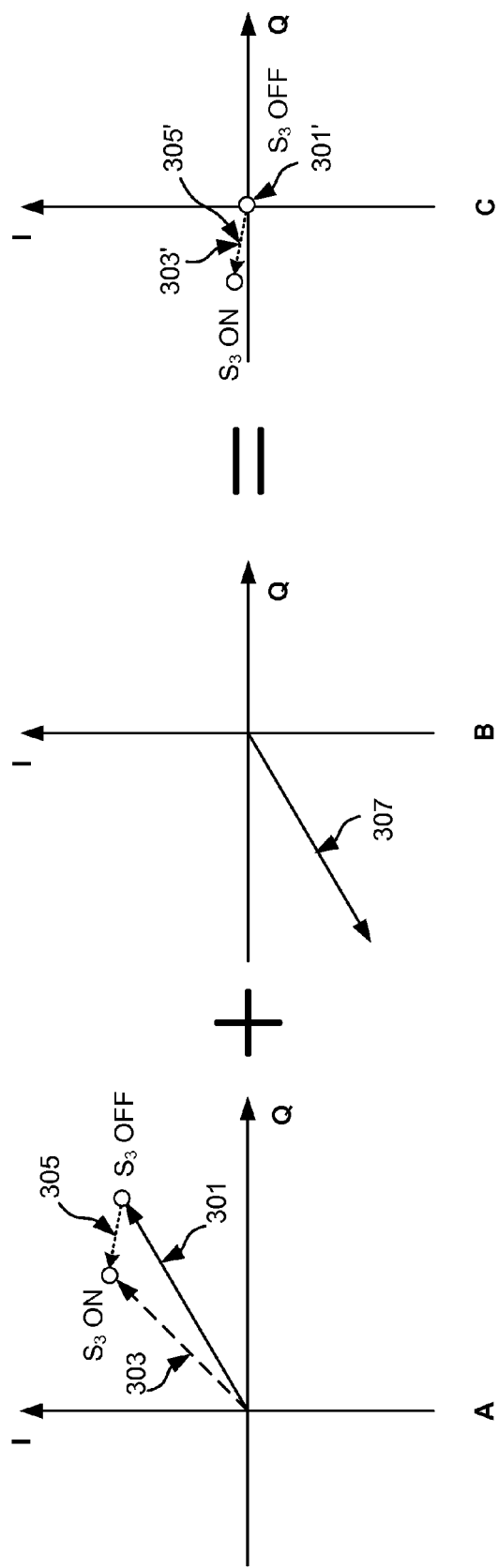
FIG. 3 illustrates three example constellation diagrams of a carrier compensation reader.

FIG. 3 illustrates three example constellation diagrams A, B, and C of a carrier compensation reader. The constellation diagrams illustrate the principle of the carrier compensation reader and shows that the carrier signal can be compensated to retrieve the backscattered signal from the carrier signal. The X axis represents the quadrature component (Q) and the Y axis represents the in-phase component (I).

In constellation diagram A, as described above, line 301, line 303, and line 305 represent the unchanged carrier signal with the switch $S_3$ being off, the changed carrier signal with the switch $S_3$ being on, and the backscattered signal, respectively. The unchanged carrier signal 215 is based on the first carrier signal. In some examples, line 303 represents the changed carrier signal 215, line 301 represents the main component of the changed carrier signal 215 (e.g., the component based on the first carrier signal), and line 305 represents the second component of the changed carrier signal 215 (e.g., the component based on the backscattered signal).

To retrieve the backscattered signal (e.g., line 305), the compensation circuit can generate a compensation signal (e.g., line 307 of FIG. 3B). The compensation signal can be configured to have an amplitude that is the same as the unchanged carrier signal (e.g., line 301 of FIG. 3A) but a phase difference of 180°. Thus the sum of the compensation signal (e.g., line 307 of FIG. 3B) and the unchanged carrier signal (e.g., line 301 of FIG. 3A) can be substantially identical to zero (e.g., a circle 301' of FIG. 3C). Correspondingly, the changed carrier signal (e.g., line 303 of FIG. 3A) can change to line 303' (e.g., vector between two circles of FIG. 3C), which is substantially identical to the backscattered signal (e.g., line 305' of FIG. 3C). As a result, the compensated carrier signal (e.g., a carrier compensation signal 219 summing the carrier signal and the compensation signal) is substantially based on the backscattered signal.

In some implementations, the carrier compensation reader 200 includes a damping circuit 208 for adjusting the new carrier signal 215 at the node B to an adjusted carrier signal 215' at a summing node P. FIG. 3 can be still used to illustrate the principle of the carrier compensation reader. In some examples, line 301 represents the adjusted carrier signal 215' with the switch $S_3$ being off, line 303 represents the adjusted carrier signal 215' with the switch $S_3$ being on, and line 305 represents the adjusted backscattered signal. Similarly, the compensation circuit can generate a new compensation signal to compensate the adjusted carrier signal, so that the compensated carrier signal can be substantially based on the backscattered signal.

Referring back to FIG. 2, in some implementations, the damping circuit 208 is coupled between the resonant circuit 202 and the receiver 206 (e.g., between the node B and the node P). The damping circuit 208 can be coupled to the voltage supply 216 to receive a supply voltage.

In some implementations, the damping circuit 208 is a resistive voltage divider comprising a series of internal switches (e.g., $S_1, S_2, S_4, S_5$), internal resistors (e.g., $R_5, R_6, R_7, R_8$) and an external resistor $R_4$ coupled between the resonant circuit 202 and the damping circuit 208. The damping circuit 208 can adjust the amplitude of the new carrier signal 215 at the node B (e.g., $V_B$) to the amplitude of the adjusted carrier signal 215' at the node P (e.g., $V_P$), and the ratio between these two amplitudes ($D=V_B/V_P$) is called a damping ratio of the damping circuit. By switching on/off one or more switches of the series of internal switches (e.g., switching on $S_1, S_5$ and off $S_2, S_4$ or off $S_1, S_5$ and on $S_2, S_4$), the damping ratio of the damping circuit 208 can be switched between two or more different values. In some implementations, the control system 212 is coupled to the damping circuit 208 to control the series of switches to determine the damping ratio of the damping circuit.

In some implementations, the system 20 applies continuously the original carrier signal 211 at the node A. The system configures the damping circuit 208 to start with a high damping ratio (e.g., D=100) in order not to overdrive the receiver 206. As discussed above, the high damping ratio can also cause the adjusted carrier signal 215' to be substantially based on the main component of the carrier signal (e.g., the component based on the first carrier signal), so that the compensation circuit can generate a suitable compensation signal to compensate the adjusted carrier signal 215' and make the carrier compensation signal 219 be substantially based on the backscattered signal.

The receiver 206 comprises a receiver input for receiving the carrier compensation signal 219 at the node P. The carrier compensation signal 219 sums the adjusted carrier signal 215' from the resonant circuit 202 and the compensation signal 217 from the compensation circuit 204 at the node P.

In some implementations, the receiver 206 comprises an analog-to-digital converter (ADC) 262. In some examples, the ADC 262 is an oversampling ADC (e.g., a Sigma Delta ADC) for converting the analog signal of the carrier compensation signal 219 into the digital domain. In some examples, the clock of the ADC 262 has a higher frequency than the original carrier signal 211, but the clock and the original carrier signal 211 (thus the first carrier signal) are phase synchronous. The ADC 262 can output a low bit count high oversampling ratio digital signal. In some implementations, the receiver 206 comprises a decimation filter coupled to the ADC 262. The decimation filter decimates the low bit count high oversampling ratio digital signal into a high bit count low oversampling ratio digital signal.

In some implementations, the receiver 206 comprises a demodulator 264 coupled to the decimation filter. The high bit count low oversampling ratio digital signal is down converted by the demodulator 264 to a low band width and high dynamic range digital signal. The receiver 206 comprises a receiver output for outputting the low band width and high dynamic range digital signal as a receiver output signal 221. In some examples, the demodulator 264 is a digital IQ demodulator, and the receiver output signal 221 includes I (e.g., in-phase) component signal 221' and Q (e.g., quadrature) component signal 221". The original carrier signal 211, the compensation signal 217, the ADC and the demodulator can be derived from a same clock source (e.g., the system clock), therefore, they are phase and frequency synchronous and the I component signal 221' and the Q component signal 221" are not rotating. The I component signal 221' and the Q component signal 221" can be used to calculate the phase and amplitude of the receiver output signal 221.

In some implementations, the compensation circuit 204 comprises a compensator 242. The compensator 242 is coupled to the receiver 206 and receives the receiver output signal 221. The compensator can calculate the amplitude and phase components of the receiver output signal 221 and generate a digital compensation signal 223 based on the calculated amplitude and phase of the receiver output signal 221. In some examples, the compensator 242 includes a phase and amplitude controllable digital sine wave generator. In some examples, the compensation signal 217 is a current signal. The compensator 242 generates a sine wave current signal. The first current of the adjusted carrier signal 215' from the resonant circuit 202 and the second current of the compensation signal 217 from the compensation circuit 204 are summed together at the node P, and the summed current signal appears as a voltage signal based on the impedance at the node P (e.g., the carrier compensation signal 219 received by the receiver input of the receiver 206).

In some implementations, the compensation circuit 204 comprises a digital-to-analog converter (DAC) 244. The DAC 244 is coupled to the compensator 242 for converting the digital compensation signal 223 to the compensation signal 217 in the analog domain.

In some implementations, the compensation circuit 204 is coupled to the control system 212. The control system 212 controls the compensation circuit 204 to generate the compensation signal 217.

In operation, the system 20 including the carrier compensation reader 200 works as follows.

First, the damping circuit 208 starts with a high damping ratio (e.g., D=100). The damping circuit 208 adjusts the new carrier signal 215 with the high damping ratio and outputs a first adjusted carrier signal 215'. As the amplitude of the main component of the carrier signal 215 is substantially larger than the amplitude of the second component of the carrier signal 215, the first adjusted carrier signal 215' will be substantially based on the main component (e.g., the component based on the first carrier signal). The control system 212 controls the compensation circuit 204 either not to generate any signal or to generate a constant signal (e.g., zero). Therefore, a first carrier compensation signal 219 received by the receiver 206 is substantially based on the first adjusted carrier signal 215' (thus based on the main component of the new carrier signal 215). The receiver 206 processes the first carrier compensation signal with the ADC 262 and the demodulator 264 to generate, at a first time, a first receiver output signal. The first receiver output signal includes information of amplitude and phase of the first carrier compensation signal. Based on the first receiver output signal, the compensator 242 of the compensation circuit 204 can calculate the amplitude and phase of the main component of the new carrier signal 215.

In some examples, the control system 212 determines that the high damping ratio of the damping circuit 208 is not suitable and a new high damping ratio is necessary to calculate the main component of the new carrier signal 215. The control system 212 controls the damping circuit 208 to adjust the new carrier signal 215 with the new high damping ratio and controls the compensation circuit 204 either not to generate any signal or to generate a constant signal (e.g., zero).

In some examples, the control system 212 determines that the high damping ratio of the damping circuit 208 is suitable and no new high damping ratio is necessary to calculate the main component of the new carrier signal 215. Then the control system controls the compensation circuit 204 to generate a new compensation signal 217. The new compensation signal is configured to compensate the main component of the carrier signal so that the carrier compensation signal summing the compensation signal and the carrier signal is substantially based on the second component of the carrier signal (e.g., the component based on the backscattered signal). As the amplitude of the second component is substantially smaller than the amplitude of the main component, the control system 212 determines a lower damping ratio (e.g., D=6). Then the control system 212 determines amplitude and phase of the new compensation signal 217 based on the determined lower damping ratio and the amplitude and phase of the main component of the new carrier signal 215 calculated by the compensator 242. Based on the amplitude and phase of the new compensation signal, the compensator 242 generates a digital signal of the new compensation signal, and the DAC 244 converts the digital new compensation signal to an analog signal new compensation signal 217.

Second, after the new compensation signal 217 is applied to the node P, the control system 212 controls the damping circuit 208 to switch to the lower damping ratio. The new carrier signal 215 is adjusted with the lower damping ratio to be a second adjusted carrier signal 215'. A second carrier compensation signal 219 sums the new compensation signal 217 and the second adjusted carrier signal 215'. Since the new compensation signal 217 is configured to substantially compensate the main component of the second adjusted carrier signal 215', the second carrier compensation signal 219 will be substantially based on the second component of the second adjusted carrier signal 215' (thus the second component of the new carrier signal 215). The receiver 206 processes the second carrier compensation signal 219 with the ADC 262 and the demodulator 264 to generate, at a second time, a second receiver output signal 221. The second receiver output signal includes information of amplitude and phase of the second carrier compensation signal. Based on the second receiver output signal 221, the compensator 242 of the compensation circuit 204 can calculate the amplitude and phase of the second component of the new carrier signal 215.

In some examples, the control system 212 determines that the low damping ratio of the damping circuit 208 is not suitable and a new lower damping ratio is necessary to calculate the second component of the new carrier signal 215. For example, suppose that the carrier compensation signal 219 includes some residue of the main component of the new carrier signal 215 in addition to the second component. In response, the control system 212 will control the damping circuit 208 to adjust the new carrier signal 215 with the new lower damping ratio and control the compensation circuit 204 to generate a new compensation signal based on the new lower damping ratio and the calculated main component of the new carrier signal 215.

In some examples, the control system 212 determines that the low damping ratio of the damping circuit 208 is suitable and no new lower damping ratio is necessary to calculate the second component of the new carrier signal 215. In response, the control system 212 will control the damping circuit 208 to keep the same lower damping ratio and control the compensation circuit 204 to output the same compensation signal 217.

Third, after the new carrier signal 215 is compensated with a suitable compensation signal and the receiver output signal 221 is substantially based on the backscattered signal, the system 20 enables the decoder 210 to decode the backscattered signal to get a decoded signal 225. The control system 212 processes the decoded signal 225 to retrieve the information from the transponder for identification and/or immobilization.

In some applications, the control system 212 can compare the retrieved information from the transponder to stored information associated with the transponder that is previously stored in the control system. If the retrieved information of transponder matches the stored information, the control system 212 determines that the transponder 220 is an authenticated transponder and authenticates the transponder 220 with the carrier compensation reader 200 (or the car having the carrier compensation reader 200). If the retrieved information does not match the stored information, the control system 212 determines that the transponder 220 is not an authenticated transponder (e.g., an invalid transponder). The control system 212 will refuse to authenticate the transponder 220 with the carrier compensation reader 200. In some examples, the control system 212 triggers an alarm to start alarming, indicating that there is invasion or theft.

Example Flowchart

Figure 4:
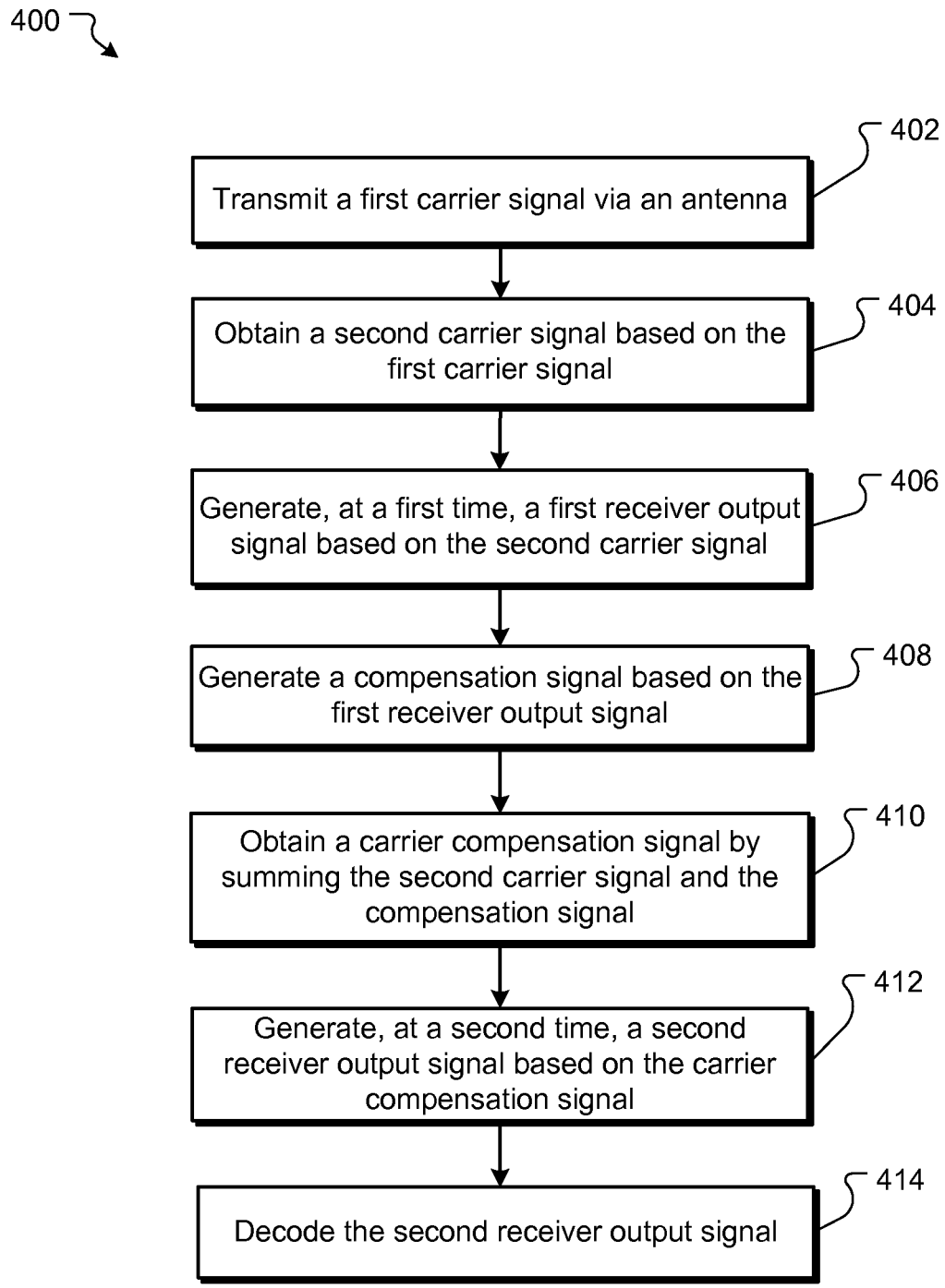
FIG. 4 is a flow diagram of an example process performed by a carrier compensation reader.

FIG. 4 is a flow diagram of an example process performed by a carrier compensation reader. The carrier compensation reader can be the carrier compensation reader 100 of FIG. 1 or the carrier compensation reader 200 of FIG. 2.

The carrier compensation reader transmits a first carrier signal via an antenna (step 402). In some implementations, the carrier compensation reader comprises a resonant circuit (e.g., the resonant circuit 202 of FIG. 2). The resonant circuit comprises the antenna (e.g., the antenna 230 of FIG. 2).

The carrier compensation reader obtains a second carrier signal based on the first carrier signal (step 404). In some implementations, the second carrier signal comprises a first component based on the first carrier signal and a second component based on a backscattered signal. The backscattered signal contains information from a transponder (e.g., the transponder 220 of FIG. 2).

The carrier compensation reader generates, at a first time, a first receiver output signal based on the second carrier signal (step 406). In some implementations, the carrier compensation reader comprises a receiver (e.g., the receiver 206 of FIG. 2). The receiver comprises a receiver input for receiving the second carrier signal and generates the first receiver output signal based on the second carrier signal.

The carrier compensation reader generates a compensation signal based on the first receiver output signal (step 408). In some implementations, the carrier compensation reader comprises a compensation circuit (e.g., the compensation circuit 204 of FIG. 2). The compensation circuit receives the first receiver output signal from the receiver and generates a compensation signal to compensate the second carrier signal.

The carrier compensation reader obtains a carrier compensation signal by summing the second carrier signal and the compensation signal (step 410). The receiver is coupled to both the resonant circuit and the compensation circuit and comprises a receiver input for receiving the carrier compensation signal summing the second carrier signal and the compensation signal. The carrier compensation reader is configured to use the compensation signal to compensate the second carrier signal so that the carrier compensation signal is substantially based on the backscattered signal.

The carrier compensation reader generates, at a second time, a second receiver output signal based on the carrier compensation signal (step 412). In some implementations, the carrier compensation signal is substantially based on the backscattered signal, and the second receiver output signal is also substantially based on the backscattered signal.

The carrier compensation reader decodes the second receiver output signal (step 414). In some implementations, the carrier compensation reader can comprise a decoder (e.g., the decoder 210 of FIG. 2) coupled to the receiver output for receiving and decoding the second receiver output signal.

In some implementations, the carrier compensation reader can include or be externally coupled to a control system (e.g., the control system of FIG. 212). The control system can retrieve the information from the transponder from the decoded second receiver output signal for identification and/or immobilization.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A device comprising:
   a resonant circuit comprising an antenna, the resonant circuit being configured to transmit, via the antenna, a first carrier signal and output a second carrier signal based on the first carrier signal;
   a receiver comprising a receiver input coupled to the resonant circuit and configured to receive the second carrier signal, the receiver comprising a receiver output; and
   a compensation circuit comprising a compensation output coupled to the receiver input and a compensation input coupled to the receiver output, wherein the compensation circuit is configured to perform first operations comprising:
      receiving, at a first time, a first receiver output signal from the receiver output;
      generating a compensation signal based on the first receiver output signal; and
      outputting the compensation signal to the receiver input so that the receiver input receives a carrier compensation signal summing the second carrier signal and the compensation signal,
   wherein the second carrier signal comprises a first component based on the first carrier signal and a second component based on a backscattered signal including information from a transponder, the second component being smaller than the first component, and
   wherein the compensation signal is configured to compensate the first component of the second carrier signal so that the carrier compensation signal is substantially based on the backscattered signal.

2. The device of claim 1, further comprising a decoder coupled to the receiver output and configured to receive, at a second time, a second receiver output signal and decode the second receiver output signal, wherein the second receiver output signal is based on the carrier compensation signal.

3. The device of claim 1, further comprising a damping circuit coupled between the resonant circuit and the compensation circuit, wherein the damping circuit is configured to perform second operations comprising:
   adjusting the second carrier signal with a first damping ratio; and
   after the compensation circuit generates the compensation signal, adjusting a new second carrier signal with a second damping ratio,
   wherein the first damping ratio has a higher value than the second damping ratio.

4. The device of claim 3, wherein the first operations further comprises:
   when the carrier compensation signal is based on the second carrier signal adjusted with the first damping ratio, generating the compensation signal based on the first receiver output signal; and
   when the carrier compensation signal is based on the new second carrier signal adjusted with the second damping ratio, outputting the compensation signal generated when the carrier compensation signal is based on the second carrier signal adjusted with the first damping ratio.

5. The device of claim 1, wherein the backscattered signal is based on a change of a circuit of the transponder.

6. The device of claim 1, wherein the first carrier signal and the compensation signal are phase synchronous.

7. The device of claim 6, wherein the sum of the amplitude value of the first component of the second carrier signal and the amplitude value of the compensation signal is substantially identical to zero.

8. The device of claim 1, wherein the backscattered signal is coded using a Manchester coded modulation.

9. The device of claim 1, wherein the antenna includes a first inductor and the transponder includes a second inductor, and wherein the resonant circuit interacts with the transponder through magnetic energy coupling between the first inductor and the second inductor.

10. The device of claim 1, wherein the first carrier signal is coded by reducing amplitude of the first carrier signal for a gap and coding data into a time distance between two adjacent gaps.

11. The device of claim 1, wherein the receiver comprises:
   an analog-to-digital converter for converting an analog signal of the carrier compensation signal to a digital signal; and a demodulator coupled to the analog-to-digital converter for demodulating the digital signal.

12. The device of claim 11, wherein the compensation circuit comprises:
a compensator for calculating amplitude and phase of the first receiver output signal and generating a digital compensation signal based on the calculated amplitude and phase of the first receiver output signal; and
a digital-to-analog converter coupled to the compensator for converting the digital compensation signal to the compensation signal.

13. The device of claim 12, wherein the compensator includes a phase and amplitude controllable digital sine wave generator.

14. The device of claim 3, wherein the adjusted second carrier signal with the first damping ratio is substantially based on the first component of the second carrier signal, and
wherein the compensation circuit is configured to:
analyze the first receiver output signal to determine the first component of the second carrier signal; and
generate the compensation signal based on the determined first component of the second carrier signal and the second damping ratio.

15. A system comprising:
a device, comprising:
a resonant circuit comprising an antenna, the resonant circuit being configured to transmit, via the antenna, a first carrier signal and output a second carrier signal including information from a transponder;
a receiver comprising a receiver input coupled to the resonant circuit and configured to receive the second carrier signal, the receiver comprising a receiver output;
a compensation circuit comprising a compensation output coupled to the receiver input and a compensation input coupled to the receiver output, wherein the compensation circuit is configured to perform first operations comprising:
receiving, at a first time, a first receiver output signal from the receiver output;
generating a compensation signal based on the first receiver output signal; and
outputting the compensation signal to the receiver input so that the receiver input receives a carrier compensation signal summing the second carrier signal and the compensation signal,
wherein the second carrier signal comprises a first component based on the first carrier signal and a second component based on a backscattered signal including the information from the transponder, the second component being smaller than the first component, and
wherein the compensation signal is configured to compensate the first component of the second carrier signal so that the carrier compensation signal is substantially based on the backscattered signal; and
a control system coupled to the receiver output, the control system configured to perform second operations comprising:
receiving, at a second time after the first time, a second receiver output signal from the receiver output, the second receiver output signal based on the carrier compensation signal; and
retrieving, from the second receiver output signal, the information from the transponder.

16. The system of claim 15, wherein the device further comprises a decoder coupled between the receiver output and the control system for decoding the second receiver output signal.

17. The system of claim 15, wherein the device further comprises a damping circuit coupled between the resonant circuit and the compensation circuit,
wherein the damping circuit is configured to:
adjust the second carrier signal with a first damping ratio; and
after the compensation circuit generates the compensation signal, adjust a new second carrier signal with a second damping ratio, wherein the first damping ratio has a higher value than the second damping ratio, and
wherein the compensation circuit is configured to:
analyze the first receiver output signal to determine the first component of the second carrier signal; and
generate the compensation signal based on the determined first component of the second carrier signal and the second damping ratio.

18. A method comprising:
transmitting, via an antenna, a first carrier signal;
obtaining a second carrier signal based on the first carrier signal;
generating, at a first time, a first receiver output signal based on the second carrier signal;
generating a compensation signal based on the first receiver output signal; and
obtaining a carrier compensation signal by summing the second carrier signal and the compensation signal,
wherein the second carrier signal comprises a first component based on the first carrier signal and a second component based on a backscattered signal including information from a transponder, the second component being smaller than the first component, and
wherein the compensation signal is configured to compensate the first component of the second carrier signal so that the carrier compensation signal is substantially based on the backscattered signal.

19. The method of claim 18, further comprising generating a second receiver output signal, at a second time after the first time, based on the carrier compensation signal.

20. The method of claim 19, further comprising decoding the second receiver output signal.

21. The method of claim 18, comprising:
adjusting the second carrier signal with a first damping ratio such that the adjusted second carrier signal with the first damping ratio is substantially based on the first component of the second carrier signal; and
analyzing the first receiver output signal to determine the first component of the second carrier signal;
generating the compensation signal based on the determined first component of the second carrier signal and a second damping ratio, wherein the first damping ratio has a higher value than the second damping ratio;
adjusting a new second carrier signal with the second damping ratio; and
obtaining the carrier compensation signal by summing the new adjusted second carrier signal with the second damping ratio and the compensation signal.

* * * * *